G. FEBLES.
Combined Sheep Rack and Trough.
No. 69,976.
Patented Oct. 22, 1867.
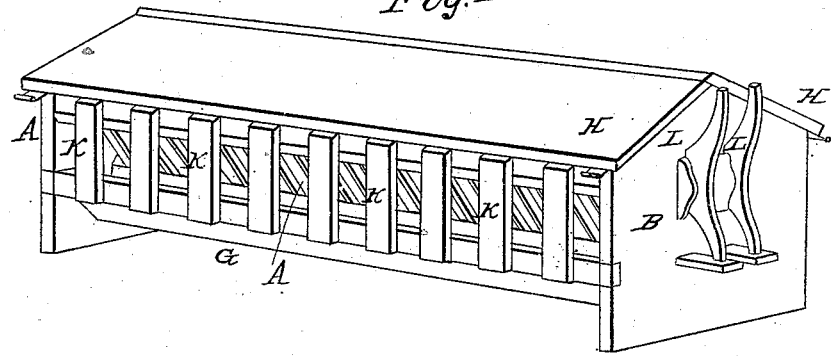
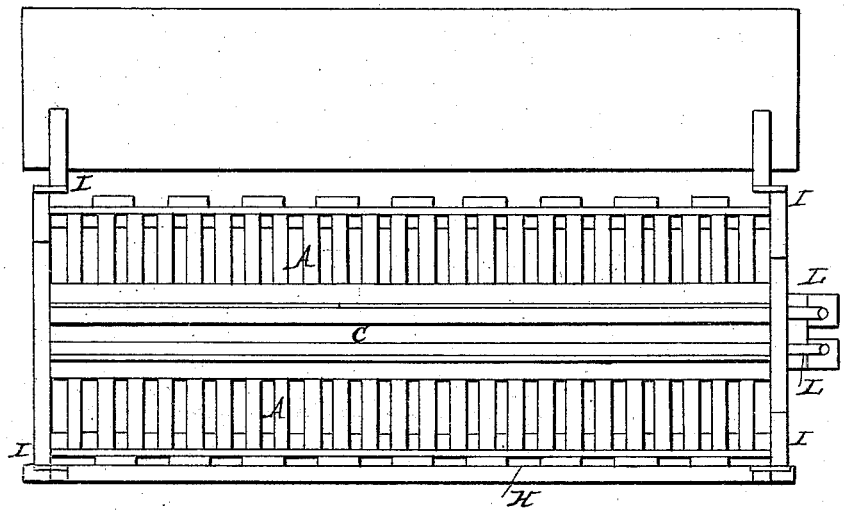
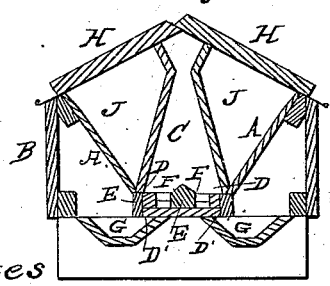
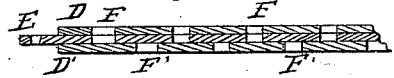
Witnesses
J. H. Burridge
E. E. Waite
Inventor
George Febles

United States Patent Office.

GEORGE FEBLES, OF FOSTORIA, OHIO.

Letters Patent No. 69,976, dated October 22, 1867.

---

IMPROVEMENT IN COMBINED SHEEP-RACK AND TROUGH.

---

The Schedule referred to in these Letters Patent and making part of the same.

---

TO ALL WHOM IT MAY CONCERN:

Be it known that I, GEORGE FEBLES, of Fostoria, in the county of Seneca, and State of Ohio, have invented certain new and useful improvements in a Combined Sheep-Rack and Trough; and I do hereby declare that the following is a full and complete description of the same, reference being had to the accompanying drawings, making a part of this specification, in which—

Figure 1 is a perspective view of the rack,
Figure 2 is a top view,
Figure 3 is a transverse section
Figure 4 is a detached section.
Like letters of reference refer to like parts in the several views.

In fig. 2, A represents the rack or racks, which are enclosed in a frame, B, fig. 1. These racks are arranged parallel to each other, and in the position, relatively to themselves and to the frame, as shown in fig. 3. Running through the centre of the frame between the racks is a grain-bin, C, fig. 4, the bottom of which is composed of two floors, D D', fig. 4, between which is a slide, E. A detached view of the slide and floors is shown in fig. 4. F is a series of holes, bored through the bottom and slide, and which communicate with the grain-bin above and the troughs G, arranged along under the bin and racks, as shown in fig. 3. These troughs are not rigidly fixed to the under side of the racks and bins, but are pivoted at the ends so that they can be turned over, for a purpose hereafter shown. Access is had to the inside of the frame by means of the covers H, which form the roof of the rack, and which are connected to the frame by the hinges I, so that they can be thrown open, as shown in fig. 2, thereby giving free access to the space J, in which to throw the hay, and to the grain-bin, above referred to. K K, fig. 1, is a range of upright bars, forming a kind of rack or guard between the sheep and rack A, between which the animals thrust their heads in order to reach the hay.

By this arrangement the droppings or waste hay, while the sheep are feeding, fall into the trough immediately under the rack, and are thereby saved and kept from being trodden under the feet of the sheep, which would not be the case if the sheep fed from the outside, as the waste would then fall upon the ground and be trodden under foot; hence but a very little hay is wasted when fed out in this rack.

The manner of feeding out grain to the sheep is as follows: The grain is thrown into the bin, which will hold from ten to twenty bushels, according to the size of the rack. The holes in the slide will hold about one-half pint each, which, on being brought in relation to the hole in the floor of the bin, as shown in fig. 4, (in which it will be seen that they are in conjunction,) will become filled with grain from the bin. Now, on pushing in the slide by means of the levers L, fig. 1, the slide-holes will be brought in conjunction with the holes F' in the lower bottom D', through which the grain in the slide-holes will fall into the trough within reach of the animals, and thus the grain is fed at once to them without disturbing or driving them away while the grain is being put in the trough, and at each time with a uniform and equal quantity to each sheep.

The troughs, in consequence of being pivoted as above described, can be cleaned out by simply tipping them sidewise, and thus allow the dirt to fall out on to the ground; hence the troughs can be at all times easily and readily emptied of all dirt they may contain. Also the covers or roof keep the grain and hay from the rain and storms, so that it is in all kinds of weather kept dry and nice for the animals.

What I claim as my improvement, and desire to secure by Letters Patent, is—

1. The adjustable pivoted racks A, troughs G, and bars K, when arranged in combination with the frame B, in the manner and for the purpose substantially as set forth.

2. The grain-bin C, slide E, in combination with the troughs G and rack A, when arranged in the manner as and for the purpose described.

GEORGE FEBLES.

Witnesses:
J. H. BURRIDGE,
FRANK S. ALDEN.